Figure 1:
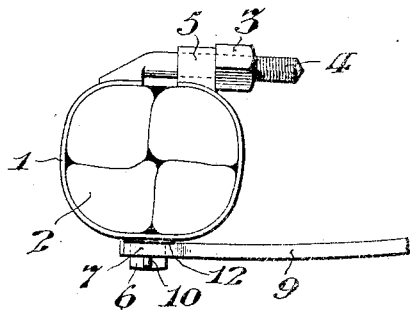

E. H. ANGLE.
ORTHODONTIC APPLIANCE.
APPLICATION FILED MAY 27, 1920.

1,367,851.

Patented Feb. 8, 1921.

Inventor
Edward H. Angle,

Witness
Elsie F. Jentzsch

By Clifton C. Caldwell
Attorney

UNITED STATES PATENT OFFICE.

EDWARD H. ANGLE, OF PASADENA, CALIFORNIA.

ORTHODONTIC APPLIANCE.

1,367,851.      Specification of Letters Patent.      Patented Feb. 8, 1921.

Application filed May 27, 1920. Serial No. 384,546.

*To all whom it may concern:*

Be it known that I, EDWARD H. ANGLE, a citizen of the United States, and a resident of Pasadena, in the county of Los Angeles, State of California, have invented certain new and useful Improvements in Orthodontic Appliances, of which the following is a specification, reference being had to the accompanying drawings.

My invention relates to devices designed for the regulation and alinement of the teeth of the dental arch, particularly to that class of devices in which an arch-bar is connected with tooth-bands or such attachment as may be engaged with selected teeth of the dental arch, and is especially directed to the means on said tooth-bands for detachably connecting the arch-bar or other tooth positioning devices therewith.

The method usually employed in the soldering of a post, spur or other projection to a tooth-band or such attachment, has been to flow solder on to the band, or upon the contiguous surface of the spur and apply heat, with said surface in contact with said band to fuse the solder and effect the union desired. This method is crude and variable in its results, especially in the hands of careless operators, as it is extremely difficult to place the spur at the proper angle by merely sight gaging, then too, there is more or less unsteadiness of the hands, which does not insure the most perfect homogeneity of the solder, hence the joint is often weak, even though plenty of solder may be used.

One of the chief objections to such method of uniting a spur to the tooth-band is that the solder tends to form around the spur at its union with said band, thus preventing the close adaptation of the sheath or collar over the spur, with respect to the band, such adaptation being highly necessary to make the assembled device as compact and as firm as possible.

The principal objects of my invention are to avoid the difficulties above noted by providing a tooth attachment, such as a tooth-band, with a spur or projection so constructed and arranged as to facilitate the operation of positioning and securing it thereto in such relation as to be readily connected with an arch-bar or equivalent structure.

Other objects of my invention are to provide a tooth-band with a spur or projection which may be swaged into such form as to prevent the solder forming around said spur in the operation of securing it to said band, and to afford a stable union between said spur and band.

Specifically stated, the form of my invention as hereinafter described, comprehends a tooth-band having secured thereto a separately formed spur or projection which is provided with a base flange affording such a broadened surface, arranged to engage the surface of said tooth-band, as to insure the proper relative position of said spur with respect to the tooth-band and to facilitate the operation of uniting them.

My invention also includes all of the various novel features of construction and arrangement as hereinafter more definitely specified.

Figure 4:
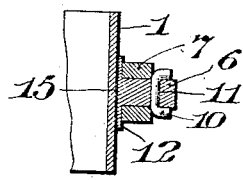
Figure 2:
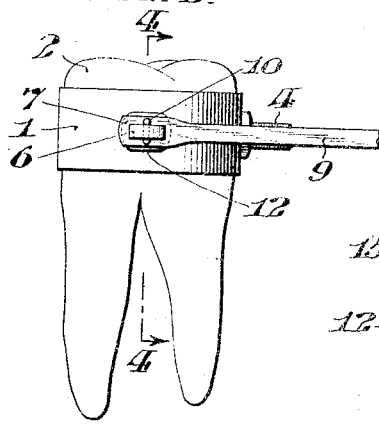
Figure 5:
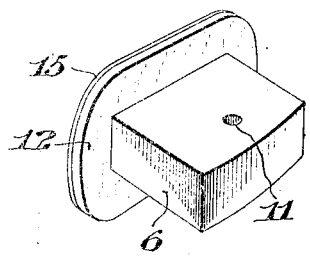
Figure 3:
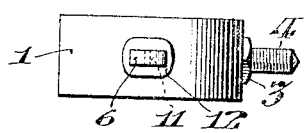

In the accompanying drawings, Figure 1 is a plan view of a convenient embodiment of my invention as applied to a lower molar serving as an anchorage abutment; Fig. 2 is a side elevational view of the structure shown in Fig. 1 as applied to said molar; Fig. 3 is a side elevational view of the tooth-band and its projecting spur shown in Figs. 1 and 2, the arch-bar being removed for convenience of illustration; Fig. 4 is an enlarged fragmentary sectional view taken on the line 4—4 in Fig. 2; and Fig. 5 is a greatly enlarged perspective view of the flanged spur *per se*, shown in the preceding figures.

In said figures, the anchor-band 1 is arranged to be attached to a molar tooth 2 as indicated in Figs. 1 and 2 by the adjusting nut 3, which is rotatably mounted on the threaded stem 4 projecting from one end of said anchor-band 1, and extends through the eye 5 on the opposite end of said anchor-band, whereby the ends of the anchor-band may be drawn toward each other to clamp it upon said molar tooth.

The tooth-band 1 is provided with the spur or projection 6 which may be of any desired form, preferably rectangular as shown to afford a connecting means over which the sheath or collar 7 forming the terminal of an arch-bar 9 may be conveniently slipped or otherwise attached.

As shown in Figs. 1, 2 and 3, the sheath or collar 7 is arranged to be prevented from accidental displacement from the spur 6 by the retaining pin or key 10 which has its shank extended through a suitably provided aperture or key-way 11 in said spur.

As illustrated in each of the figures but best shown in Figs. 4 and 5, the spur 6 is provided with the base flange 12 which not only affords a surface of ample area to effect a tenacious attachment of said spur 6 to the wall of the tooth-band 1, but insures accuracy, stability and compactness, and minimizes the difficulties of making the attachment, particularly in properly positioning said spur with respect to said tooth-band.

As shown in Figs. 4 and 5, the surface of the flange 12 which is contiguous to the tooth-band 1 may preferably be provided with a thin uniform film of solder 15 rolled, pressed, stamped or otherwise applied thereto which when subjected to a sufficient degree of heat may be caused to effect a union between said flange and the wall of the tooth-band 1, as best shown in Fig. 4.

My invention is advantageous in that the spur or projection may be swaged or stamped with a base flange which affords a greatly increased area so that when placed against the tooth-band, automatically adjusts the axis of the spur in proper angular relation to the wall of said band, and as the base flange extends beyond the shank of the spur it is impossible for the solder to interfere with the attachment of any device such as an arch-bar therewith.

I do not desire to limit my invention to the precise details of construction and arrangement as herein specified, as it is obvious that various modifications may be made therein without departing from the essential features of my invention as defined in the appended claims.

Having thus described my invention, I claim:—

1. An orthodontic appliance comprising a tooth attachment having secured thereto a separately formed projecting member provided with an enlarged base.

2. An orthodontic appliance comprising a spur having a flange arranged to be secured to a tooth attachment.

In witness whereof, I have hereunto set my hand this 19th day of May, A. D., 1920.

EDWARD H. ANGLE.

Witnesses:
  GEORGE T. JUDD,
  S. L. BIERBAUER,
  F. H. GATES.